(12) United States Patent
Kim

(10) Patent No.: US 7,423,648 B2
(45) Date of Patent: Sep. 9, 2008

(54) ON SCREEN DISPLAYING DEVICE SUPPORTING PROPORTIONAL FONT AND METHOD THEREOF

(75) Inventor: Young-chan Kim, Ulwang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 643 days.

(21) Appl. No.: 10/909,325

(22) Filed: Aug. 3, 2004

(65) Prior Publication Data

US 2005/0034073 A1    Feb. 10, 2005

(30) Foreign Application Priority Data

Aug. 4, 2003    (KR) .................. 10-2003-0053883

(51) Int. Cl.
*G06T 11/00* (2006.01)

(52) U.S. Cl. ........................................ 345/471; 715/716

(58) Field of Classification Search ................ None
See application file for complete search history.

(56) References Cited

U.S. PATENT DOCUMENTS

| | | | | |
|---|---|---|---|---|
| 2,672,794 A | * | 3/1954 | Freund | 396/552 |
| 4,371,274 A | * | 2/1983 | Jaeger | 400/306 |
| 5,432,890 A | * | 7/1995 | Watanabe | 715/519 |
| 5,802,532 A | * | 9/1998 | Nakayama et al. | 715/519 |
| 5,825,999 A | * | 10/1998 | Uzaki et al. | 345/467 |
| 5,937,420 A | * | 8/1999 | Karow et al. | 715/518 |
| 6,181,353 B1 | * | 1/2001 | Kurisu | 345/537 |
| 6,400,367 B2 | * | 6/2002 | Kire | 345/467 |
| 6,657,626 B1 | * | 12/2003 | Shintoku | 345/467 |
| 6,829,748 B1 | * | 12/2004 | Browne et al. | 715/531 |
| 6,967,689 B1 | * | 11/2005 | Chu | 348/569 |
| 2004/0021617 A1 | * | 2/2004 | Blum et al. | 345/1.3 |

FOREIGN PATENT DOCUMENTS

| | | | |
|---|---|---|---|
| DE | 3742394 A1 | * | 6/1989 |
| JP | 09-55897 | | 2/1997 |
| JP | 11-282451 | | 10/1999 |
| JP | 2001-346118 | | 12/2001 |
| KR | 226962 B1 | | 7/1999 |
| KR | 11402 A | | 2/2000 |

* cited by examiner

*Primary Examiner*—Kee M. Tung
*Assistant Examiner*—David H Chu
(74) *Attorney, Agent, or Firm*—Stanzione & Kim, LLP

(57) ABSTRACT

An on-screen display device which supports a proportional font, and a method thereof. The method includes reading fonts which correspond to string characters, deciding a font width, deciding a shift parameter of a font based on the font width, combining a font shifted by the determined shift parameter with a prior shifted font, and producing font data for an on-screen display when a result of the combined fonts fills a width of a basic font area.

25 Claims, 9 Drawing Sheets

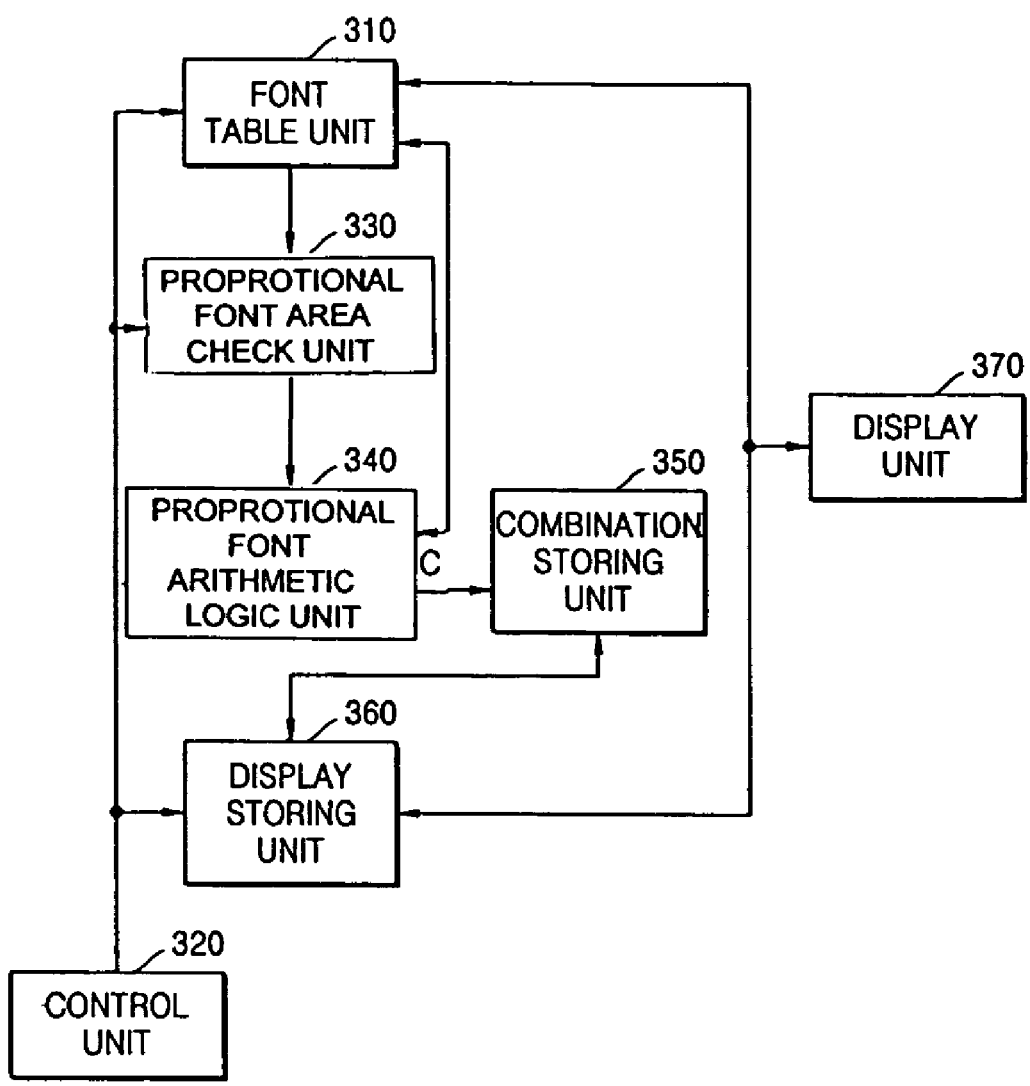

FONT WIDTH = END PIXEL − START PIXEL _ ALPHA
(ALPHA = USER DEFINE VALUE)

ON SCREEN DISPLAYING DEVICE SUPPORTING PROPORTIONAL FONT AND METHOD THEREOF

CROSS-REFERENCE TO RELATED APPLICATIONS

This application claims the priority of Korean Patent Application No. 2003-53883, filed on Aug. 4, 2003, in the Korean Intellectual Property Office, the disclosure of which is incorporated herein in its entirety by reference.

BACKGROUND OF THE INVENTION

1. Field of the Invention

The present general inventive concept relates to a display device, and more particularly, to an on-screen display (OSD) device to support a proportional font and a method thereof.

2. Description of the Related Art

In general, a user operates a display device using a current time set up, time recording and cancellation, and a channel change through each OSD function. The display device combines and displays OSD information corresponding to the respective OSD functions with an image signal on a blue-back screen, which is convenient for the user and provides easy recognition of a mode change (channel change or input change).

Generally, a display device mainly uses graphic fonts and character-based fonts to display the OSD information. When using the character-based fonts, regardless of a size of a character, the display device displays the OSD information with an identical font size, and when using the graphic fonts, the display device displays high quality OSD information.

FIG. 1 is an example of an OSD string phrase displayed using conventional character-based fonts.

Referring to FIG. 1, each character can be displayed using only one font within a 12 pixel×18 pixel area, which corresponds to a font storing unit.

FIG. 2 is an example of an OSD including the string phrase shown in FIG. 1.

However, when a character-based font is used in the OSD as shown in FIGS. 1 and 2, a large number of characters cannot be displayed in OSD regions, thereby sufficient information can not be provided to the user. On the contrary, when graphic-based fonts are used, a large memory must be used to accommodate a large amount of data.

SUMMARY OF THE INVENTION

In order to solve the foregoing and/or other problems, it is an aspect of the present general inventive concept to provide an on-screen display (OSD) device and an on-screen display method for the display device which uses character based font to produce proportional font and provide high-quality OSD information.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing an on-screen display method of a display device, the method including reading a font corresponding to a string character to be displayed and determining a font width, determining a shift parameter of the font based on the determined font width, combining the font shifted by the determined parameter with a prior shifted font, and displaying the combined fonts when the widths of all the fonts are adjusted by the combination of the shift parameters.

The foregoing and/or other aspects of the present general inventive concept may also be achieved by providing an on-screen display device including a font area determination unit, which determines whether to display a font in a character-based font display area, a font arithmetic logic unit which determines a shift parameter of the font based on a font width within the font area determined by a font display area determiner and outputs a combination of fonts obtained by combining a shifted font with a prior shifted font, and a display unit which displays fonts combined in the font arithmetic unit in a predetermined area.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 3A is a block diagram illustrating an on-screen display device according to an embodiment of the present general inventive concept.

DETAILED DESCRIPTION OF THE PREFERRED EMBODIMENTS

Figure 1:
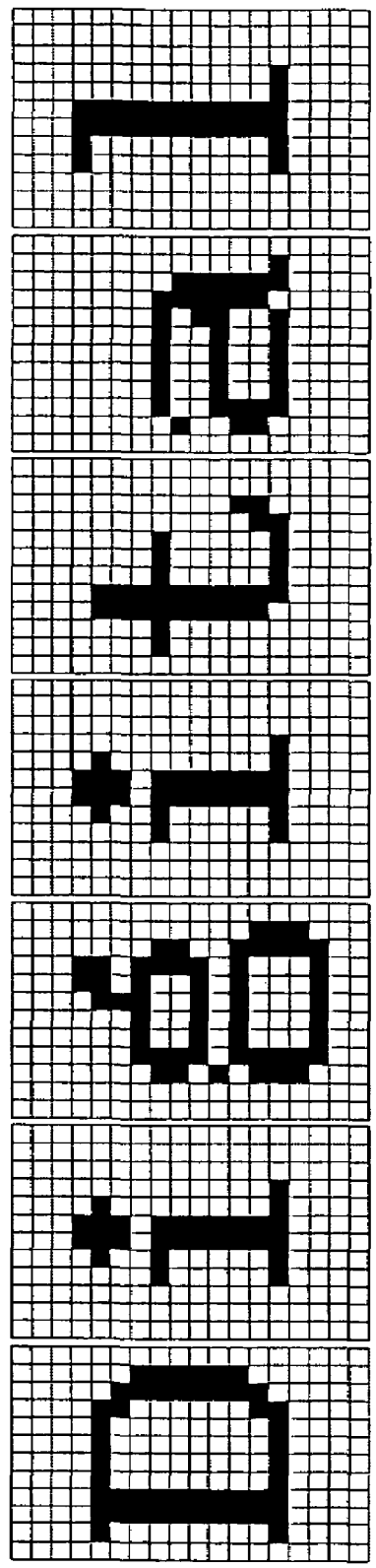
FIG. 1 is an example of a string phrase displayed using conventional character-based fonts.
Figure 2:
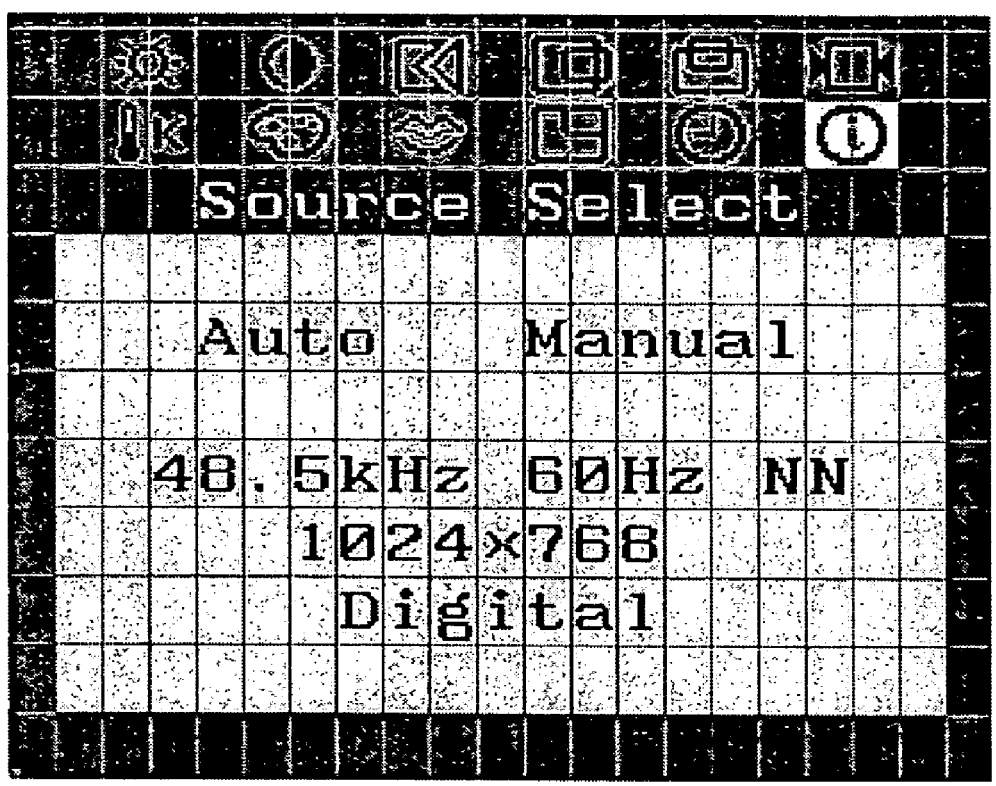
FIG. 2 is an example of an on-screen display using the string phrase shown in FIG. 1.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 3A is a block diagram illustrating an on-screen display device supporting a proportional font according to an embodiment of the present general inventive concept.

Referring to FIG. 3A, a font table unit 310 can store characters which a user can display as a base of an on-screen display (OSD). In general, the characters of the font table unit 310 can be encoded and stored in a read only memory (ROM).

A proportional font area checking unit 330 can receive area information on an area that will display proportional fonts from a control unit 320, and can check whether the proportional fonts should be displayed in this area.

A proportional font arithmetic logic unit 340 can read display fonts from the font table unit 310 which will be displayed in font areas checked by the proportional font area checking unit 330, can decide on a shift parameter based on a width of the display fonts that were read, and can shift the display fonts right and left according to the shift parameter to produce a combination of fonts in which a font is combined with a prior shifted font.

A combination storing unit 350 can store the combination of fonts combined in the proportional font arithmetic logic unit 340.

A display unit 370 can display the combined fonts stored in a display storing unit 360.

A control unit 320 can provide information on a display position, an address, and attributes of the font to the display storing unit 360, can provide proportional font area information to the proportional font area checking unit 330, and can read characters of a string of the fonts from the font table unit 310.

Figure 3B:
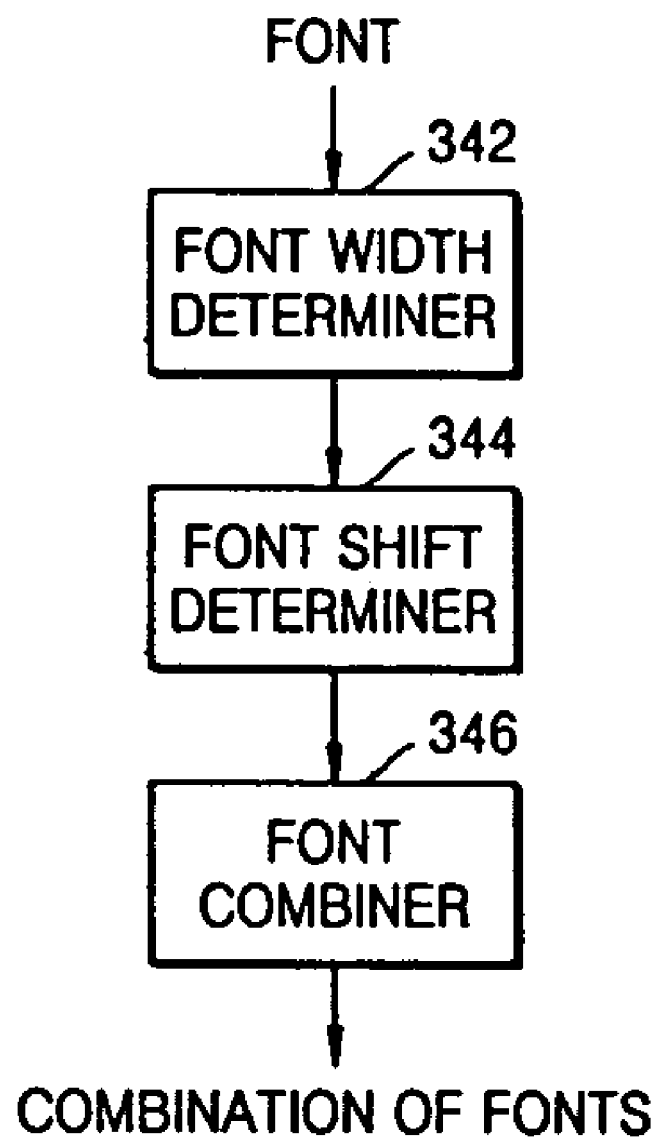
FIG. 3B is a view illustrating a proportional font arithmetic logic unit of the on-screen display device of FIG. 3A.

FIG. 3B is a view illustrating the proportional font arithmetic logic unit 340 shown in FIG. 3A.

A font width determiner 342 can determine the width of the font to be displayed in the font area checked by the proportional font area checking unit 330.

A font shift determiner 344 can decide the shift parameter of the font based on the font width determined by the font width determiner 342.

A font combiner 346 can apply the shift parameter decided by the font shift determiner 344, can combine the shifted font with the prior shifted font, and can output the combination of fonts.

Figure 4:
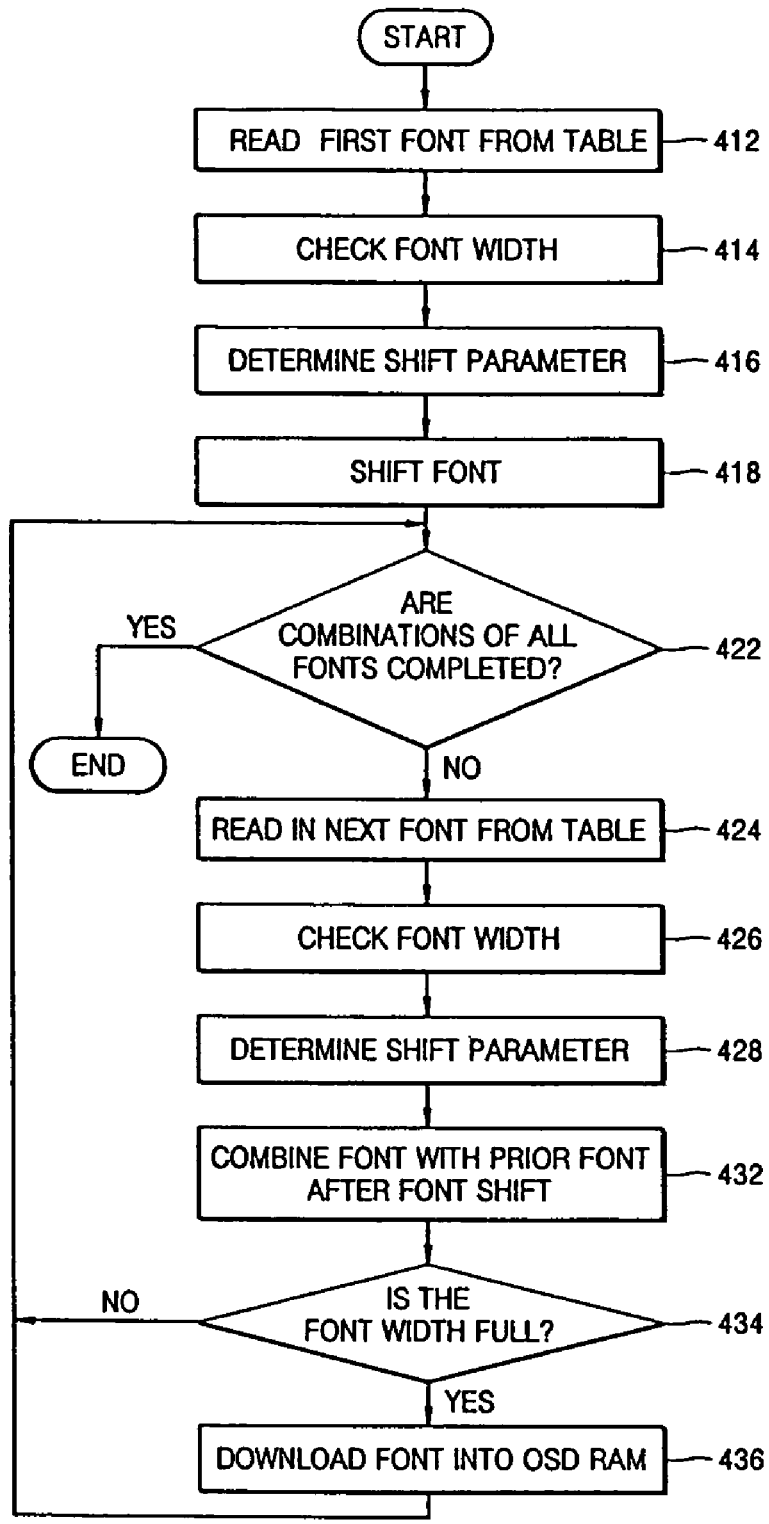
FIG. 4 is a flow chart illustrating an on-screen display method which supports a proportional font according to another embodiment of the present general inventive concept.

FIG. 4 is a flow chart illustrating an on-screen display method that supports a proportional font according to an embodiment of the present general inventive concept. The flow chart of FIG. 4 will be explained referring to FIGS. 5 through 8.

Referring FIGS. 3A through 8, the information on the area in which the proportional fonts will be displayed is received.

Figure 5:
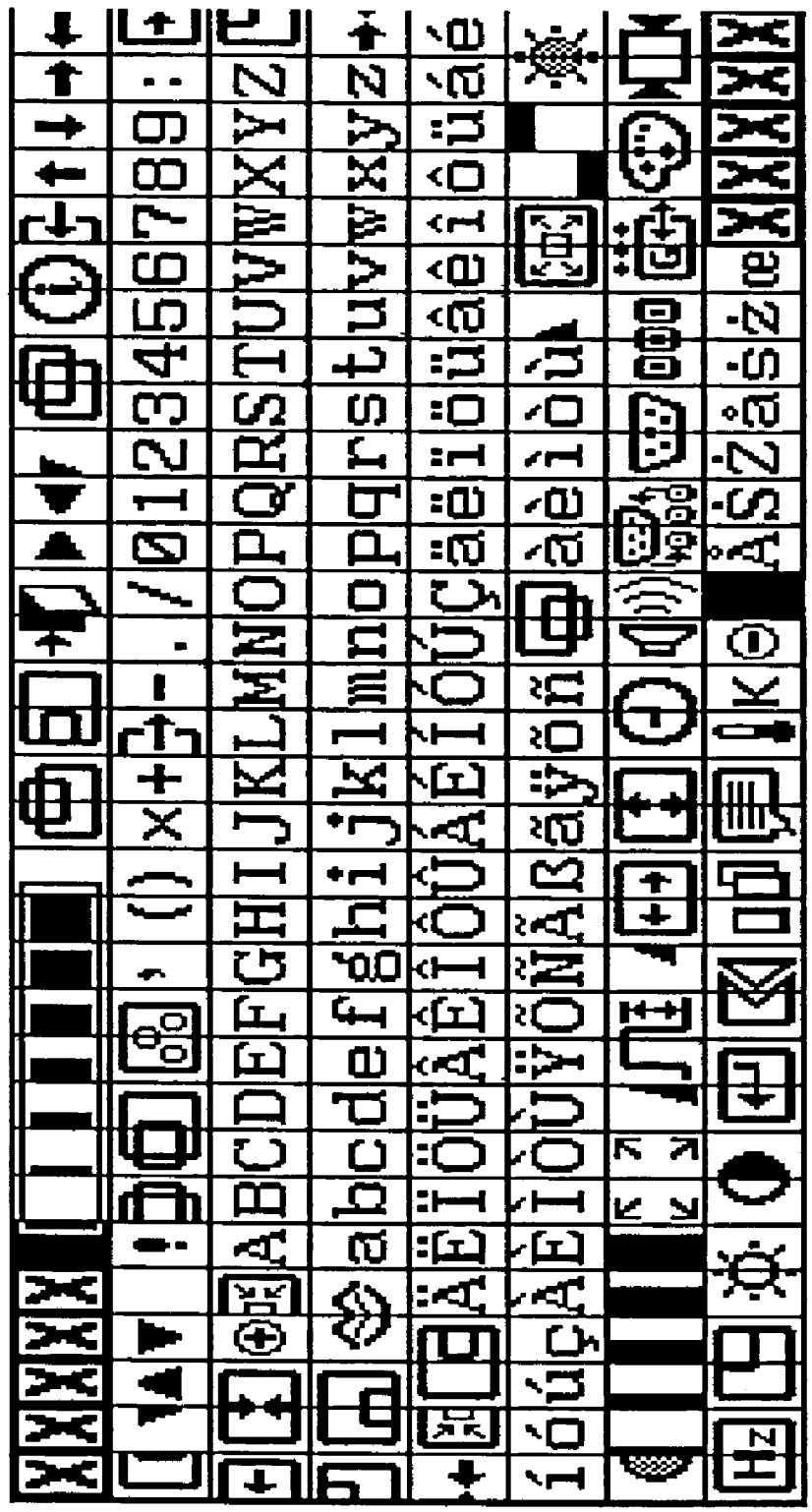
FIG. 5 is a character table which is used to display an OSD.

A first font, which corresponds to a string character to be displayed from a character table shown in FIG. 5, can be read (operation 412).

Figure 6:
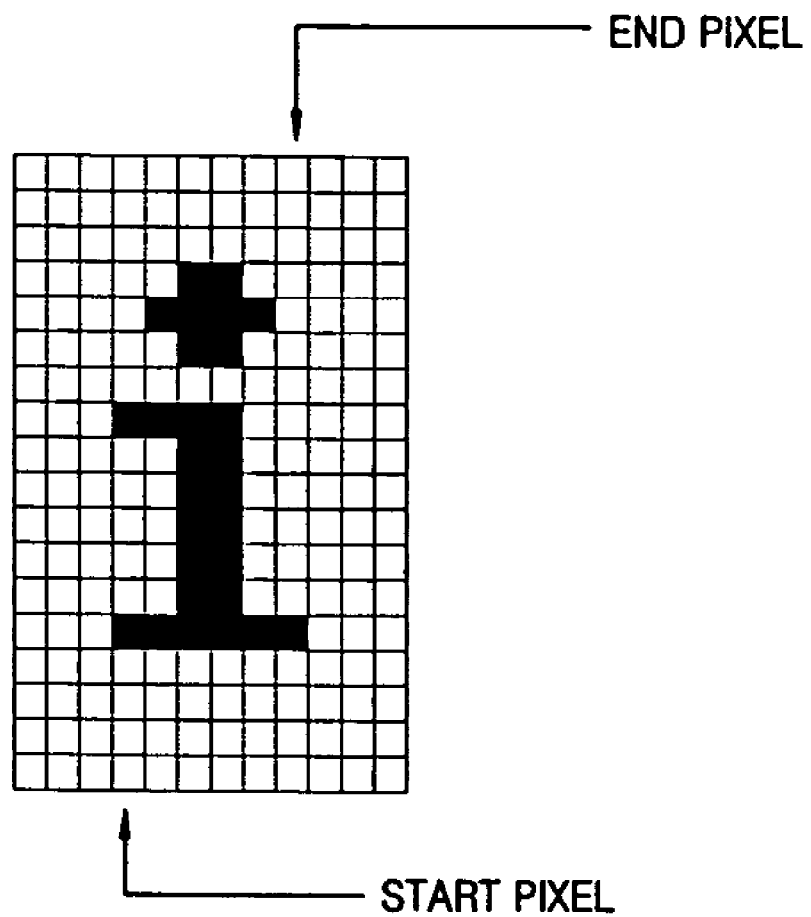
FIG. 6 is a view illustrating a determining process of the width of a font.

A width of the first font that is read can be checked (operation 414). For example, as shown in FIG. 6, if a font read is "i," a font width of "i" is determined by equation (1) using information on positions of an end pixel and a start pixel.

$$\text{Font width} = \text{End Pixel} - \text{Start Pixel} + \alpha \quad (1)$$

where $\alpha$ is a user-defined value.

A shift parameter of the font can be determined based on the determined font width of the read font (operation 416). For example, as shown in FIG. 6, shifting the font "i" by three pixels to the left within a 12 pixel×18 pixel area can be expressed as −3.

The font can be shifted right or left according to the determined shift parameter. For example, when the shift parameter is −3, the font "i" is shifted by three pixels to the left.

The completion of the combination of the fonts that should be displayed can be checked (operation 422). If the combination of the fonts is not completed, a second font corresponding to the string character from the character table shown in FIG. 5 can be read (operation 424).

A width of the second font read can be checked using equation (1) (operation 426).

The shift parameter of the second font based on the checked font width (operation 428) can be determined.

After shifting the second font left or right according to the determined shift parameter, the first font can be combined with the second shifted font (operation 432). For example, as shown in FIG. 7, if the first font is "i" and the second font is "g" within a 12 pixels×18 pixels area 710, a portion of the second font "g" is displayed in a remaining area where the first font "i" is located.

Figure 7:
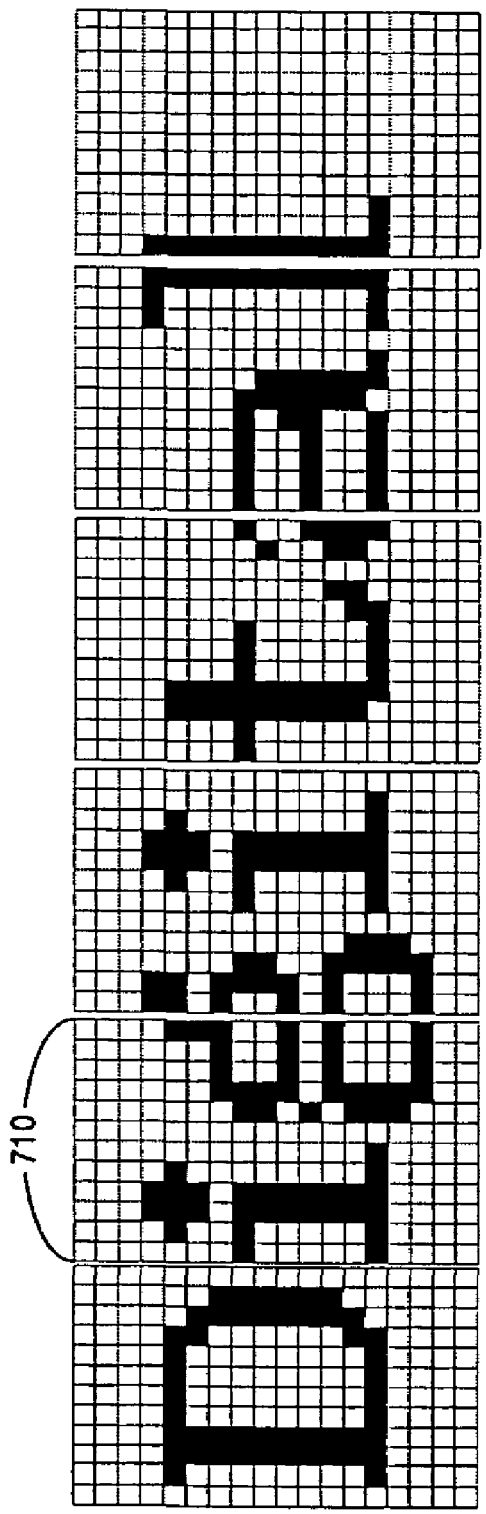
FIG. 7 is a view illustrating a string phrase which is produced when a shift and a combination function of a font are carried out.

Therefore, if the combined result completely fills a basic width (an entire width of the area 710 needed to download a conventional font), the combined fonts, for example, the combined fonts of the 12×18 pixel area 710 shown in FIG. 7 can be downloaded (operation 436) into the display storing unit 360.

The above-described process can be repeated until the combination of all the fonts corresponding to a desired character string is completed. As a result, the shifting and combining process on the fonts that form the desired character string is performed, and the fonts can be aligned within a character frame in predetermined intervals.

Figure 8:
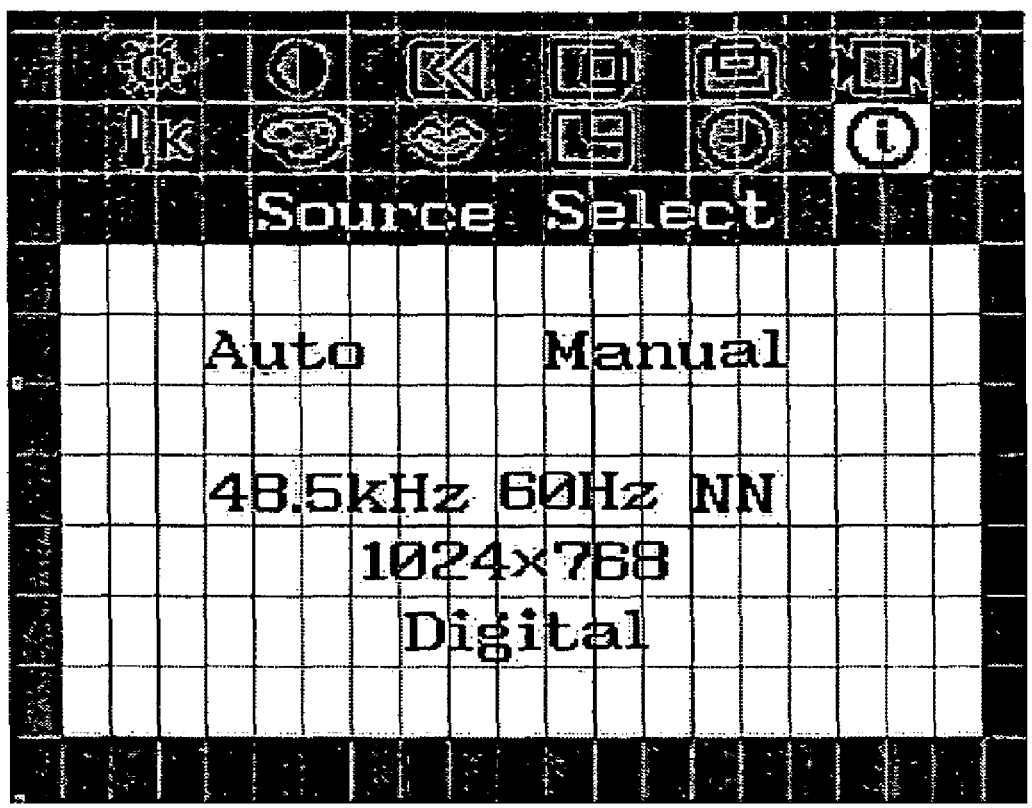
FIG. 8 is a view illustrating an OSD using a proportional font according to an embodiment of the present general inventive concept.

When the widths of all the fonts are finally adjusted, OSD information can be displayed using the combined fonts in the display area, which displays proportional font as shown in FIG. 8.

The present general inventive concept can be realized as a code on a recording medium readable by a computer. The recording medium, which a computer can read can include all kinds of recording devices which store data that can be read by a computer system. A ROM, a RAM, OD-ROMs, magnetic tapes, hard disks, floppy disks, a flash memory, and optical data storing devices can be examples of the recording medium. The code can also be in a carrier wave form (for example, transmission through the Internet). Furthermore, the recording medium can be accessed from the computer in a computer network, and the code can be stored and executed in a remote method.

As described above, in the present general inventive concept by producing proportional fonts using character-based fonts in the display device, high quality OSD can be provided and a size of the memory in which fonts are stored can be reduced.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An on-screen display method of a display device, comprising:
    reading a font corresponding to a string character to be displayed and determining a font width;
    determining a shift parameter associated with an amount the font may be shifted of the font within a font storing unit which corresponds to a pixel area based on the determined font width;
    combining the font shifted by the determined shift parameter with a prior shifted font; and
    producing font data as an on-screen display from the combined fonts when an adjustment value of the font and the combined fonts fill the font storing unit.

2. The on-screen display method of claim 1, wherein:
    the font width is equal to a sum of the value and a difference between an end position of a pixel and a starting position of the pixel; and
    the value is a user defined value.

3. The on-screen display method of claim 1, wherein the combining of the shifted font with the prior shifted font comprises adjusting a width between a first font and a second font to a predetermined value within the font storing unit.

4. The on-screen display method of claim 1, wherein, when a width of the combined fonts correspond to the font storing unit, the combined fonts are downloaded into a display area.

5. The on-screen display method of claim 1, further comprising:
   selecting a certain area to combine the fonts.

6. An on-screen display device comprising:
   a font area determination unit which determines whether to display a font in a character-based font display area;
   a font arithmetic logic unit which determines a shift parameter associated with an amount the font may be shifted of the font based on a font width within a font area determined by a font area determiner and outputs a combination of fonts obtained by combining a shifted font with a prior shifted font; and
   a display unit which displays fonts combined in the font arithmetic unit in a predetermined area.

7. The on-screen display device of claim 6, wherein the font arithmetic logic unit comprises:
   a font width determiner, which determines the font width that will be displayed in the font area;
   a font shift determiner which determines the shift parameter of the font based on the font width that is determined by the font width determiner; and
   a font combiner which combines the font shifted by the shift parameter determined in the font shift determiner and the prior shifted font to produce the combination of fonts.

8. A computer readable storage medium having embodied thereon a computer program to execute an on-screen display method, the method comprising:
   reading a font corresponding to a string character to be displayed and determining a font width of the font;
   determining a shift parameter associated with an amount the font may be shifted of the font within a font storing unit which corresponds to a pixel area according to the determined font width of the font;
   combining the font shifted by the determined shift parameter with a prior shifted font; and
   producing font data as an on-screen display from the combined fonts when the combined fonts fill the font storing unit.

9. An on-screen display method, comprising:
   receiving a first font having a first character and a first space, and a second font having a second character and a second space disposed adjacent to the first space of the first font;
   determining a first shift parameter associated with an amount the first font may be shifted of the first font according to a pre-determined font width of the first font and a second shift parameter associated with an amount the second font may be shifted of the second font according to another pre-determined font width of the second font; and
   adjusting at least one of the first space and the second space by a predetermined value corresponding to at least one of the first shift parameter and the second shift parameter by combining the second font with the first font to display the adjusted first font and the adjusted second font within a predetermined area.

10. The on-screen display method of claim 9, wherein the adjusting of the at least one of the first space and the second space comprises:
    reducing a sum of the first space and the second space to a third space smaller than the sum of the first space and the second space.

11. The on-screen display method of claim 9, wherein adjusting of the at least one of the first space and the second space comprises:
    reducing a gap between the first character and the second character to another gap narrower than a sum of the first space and the second space.

12. The on-screen display method of claim 9, wherein the first font comprises another space disposed opposite to the first space with respect to the character, and the another space is adjusted when a third font is disposed opposite to the second font with respect to the first font.

13. The on-screen display method of claim 12, wherein the first character comprises pixels from a first pixel to an end pixel in a display direction, and a length of the pixels is not changed while one of the first space and the another space is reduced.

14. The on-screen display method of claim 9, further comprising:
    determining a shift parameter according to the predetermined area to adjust the at least one of the first space and the second space.

15. The on-screen display method of claim 14, wherein the adjusting of the at least one of the first space and the second space comprises reducing the first space to a first sub-space according to the shift parameter and the second space to a second sub-space according to the shift parameter.

16. The on-screen display method of claim 15, wherein the first sub-space and the second sub-space are the same.

17. The on-screen display method of claim 9, further comprising:
    determining the number of proportional fonts including the first font and the second font to adjust the at least one of the first space and the second space.

18. The on-screen display method of claim 9, wherein the adjusting of the at least one of the first space and the second space comprises generating a first sub-font having the first character and the adjusted first space, and a second sub-font having the second character and the adjusted second space so that the first sub-font and the second sub-font are displayed within the predetermined area.

19. The on-screen display method of claim 18, wherein a sum of the first sub-font and the second sub-font is less than a sum of the first font and the second font.

20. The on-screen display method of claim 9, wherein a length of the predetermined area is less than a sum of the first font and the second font.

21. The on-screen display method of claim 9, wherein a length of the predetermined area is the same as a sum of the adjusted first and second spaces and the first and second characters.

22. An on-screen display device, comprising:
    a proportional font area check unit to receive a first font having a first character and a first space, and a second font having a second character and a second space disposed adjacent to the first space of the first font; and
    a proportional font arithmetic logic unit to determine a first shift parameter associated with an amount the first font may be shifted of the first font according to a pre-determined font width of the first font and a second shift parameter associated with an amount the second font may be shifted of the second font according to another pre-determined font width of the second font, and to adjust at least one of the first space and the second space by a predetermined value corresponding to at least one of the first shift parameter and the second shift parameter by combining the second font with the first font to display the adjusted first font and the adjusted second font within a predetermined area.

23. The on-screen display device of claim 22, wherein a length of the predetermined area is shorter than a sum of lengths of the first font and the second font.

24. The on-screen display device of claim 22, wherein the first character and the second character are not adjusted in the proportional font arithmetic logic unit.

25. An on-screen display device, comprising:

a plurality of font storing units, which corresponds to pixel areas, to each store one of a plurality of fonts;

a font arithmetic logic unit to shift the plurality of fonts within each of the plurality of font storing units based on corresponding widths of the plurality of fonts by combining a shifted font of the plurality of fonts with a prior shifted font of the plurality of fonts to fit within a display range; and a display unit to display the plurality of fonts within the display range.

* * * * *